United States Patent
Hidden

(10) Patent No.: US 8,167,442 B1
(45) Date of Patent: May 1, 2012

(54) VEHICLE SIDE-VIEW MIRROR AND WINDOW CLEARING DEVICE AND ASSOCIATED METHODS

(76) Inventor: Frank L. Hidden, Orlando, FL (US)

(*) Notice: Subject to any disclaimer, the term of this patent is extended or adjusted under 35 U.S.C. 154(b) by 333 days.

(21) Appl. No.: 12/553,301

(22) Filed: Sep. 3, 2009

Related U.S. Application Data

(60) Provisional application No. 61/094,419, filed on Sep. 5, 2008.

(51) Int. Cl.
*B60R 1/06* (2006.01)
(52) U.S. Cl. .......... 359/507; 359/509
(58) Field of Classification Search .......... 359/507, 359/508, 509
See application file for complete search history.

(56) References Cited

U.S. PATENT DOCUMENTS

| | | | |
|---|---|---|---|
| 2,796,506 A | 6/1957 | Lumbert | |
| 3,059,540 A | 10/1962 | Robinson | |
| 3,455,624 A * | 7/1969 | Godfrey | 359/509 |
| 3,859,899 A * | 1/1975 | Mills | 454/164 |
| 4,248,497 A | 2/1981 | Leighton | |
| 4,439,013 A * | 3/1984 | Hagn et al. | 359/509 |
| 4,449,796 A * | 5/1984 | Janssen et al. | 359/507 |
| 4,538,851 A * | 9/1985 | Taylor | 296/180.1 |
| 4,580,881 A * | 4/1986 | Kim | 359/868 |
| 4,869,581 A | 9/1989 | Matulich | |
| 4,898,458 A | 2/1990 | McDonald | |
| 4,963,011 A * | 10/1990 | Lu et al. | 359/509 |
| 4,979,809 A | 12/1990 | Peters | |
| 5,179,470 A | 1/1993 | Olson | |
| 5,343,328 A | 8/1994 | Chang | |
| 5,383,054 A * | 1/1995 | Chang | 359/507 |
| 5,815,315 A * | 9/1998 | Garland et al. | 359/509 |
| 5,868,867 A | 2/1999 | Clukey | |
| 5,903,389 A * | 5/1999 | Rumez et al. | 359/509 |
| 5,953,158 A * | 9/1999 | Kamakura et al. | 359/509 |
| 6,012,817 A * | 1/2000 | Kamakura et al. | 359/509 |
| 6,290,361 B1 | 9/2001 | Berzin | |
| 6,386,712 B1 | 5/2002 | Warner | |
| 6,749,306 B2 | 6/2004 | Lindsay | |
| 2007/0273971 A1 * | 11/2007 | Waldmann et al. | 359/509 |

FOREIGN PATENT DOCUMENTS

| | | |
|---|---|---|
| DE | 4028983 | 3/1992 |
| EP | 0069164 | 1/1983 |
| GB | 2048191 | 12/1980 |
| GB | 2058695 | 4/1981 |
| JP | 55044054 | 3/1980 |
| JP | 61081249 | 4/1986 |
| JP | 62265047 | 11/1987 |

* cited by examiner

*Primary Examiner* — Ricky D Shafer
(74) *Attorney, Agent, or Firm* — Gray Robinson, P.A.; Carl M. Napolitano

(57) ABSTRACT

A device for preventing and clearing fouling on a side-view mirror includes a curved tube affixable to a vehicle having an inlet positionable facing forward in spaced-apart relation from the side-view mirror. An outlet is positionable facing the mirror's surface. An outer wall defines a lumen extending from the inlet to the outlet. The tube describes a partial "U", with a rearmost portion of the tube extending generally rearward. Apertures extend through the wall adjacent the tube's rearmost portion, facing rearward. When the vehicle is moving forward, air is forced into the device's inlet and passes through the tube's lumen to exit the outlet, onto the mirror, preventing droplet buildup and fogging. The rearward-facing apertures channel moisture out of the tube's lumen, preventing additional droplets from impinging on the mirror. In an embodiment, a side window portion also provides for preventing and clearing fouling of a side window.

20 Claims, 4 Drawing Sheets

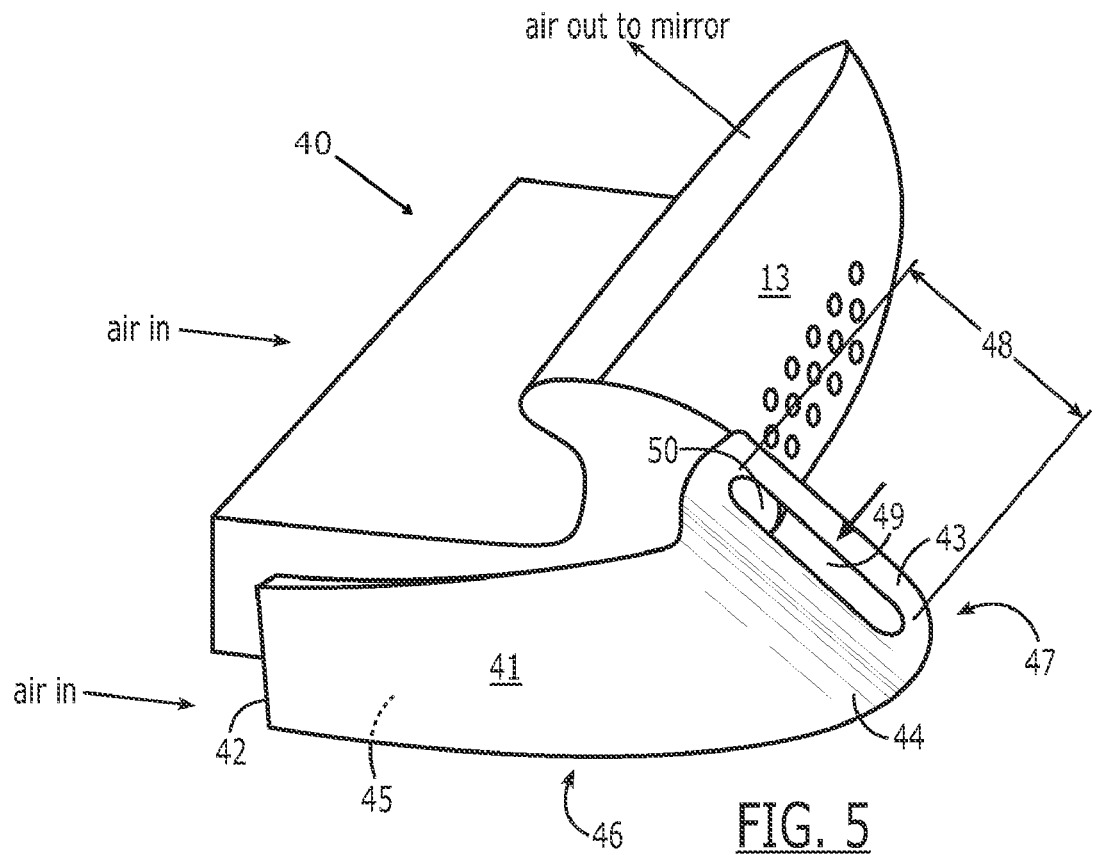
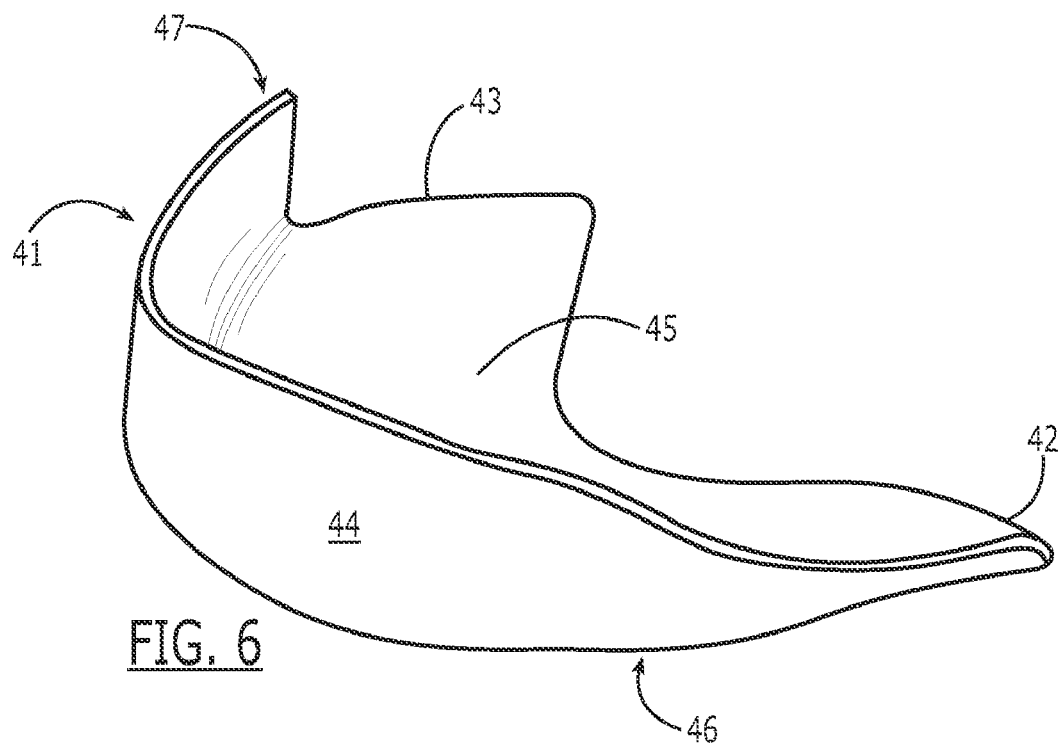

VEHICLE SIDE-VIEW MIRROR AND WINDOW CLEARING DEVICE AND ASSOCIATED METHODS

CROSS-REFERENCE TO RELATED APPLICATION

This application claims priority to provisional patent application 61/094,419, filed Sep. 5, 2008.

BACKGROUND OF THE INVENTION

1. Field of the Invention

The present invention relates to devices and methods for improving the operation of a side-view mirror of a vehicle, and, more particularly, to such devices and methods for maintaining side-view mirror effectiveness in inclement weather.

2. Description of Related Art

During inclement weather side-view mirrors mounted on an exterior of a vehicle can become difficult to use owing to water droplets remaining on, and/or to fogging of, the mirror surface. This mirror fouling can result in a dangerous situation in which the vehicle operator has diminished ability to use one or both of the vehicle's side-view mirrors.

Various attempts have been made to address this problem, but none has been completely successful.

Therefore, it would be beneficial to provide a device and associated methods for improving the effectiveness of side-view mirrors in inclement weather.

SUMMARY OF THE INVENTION

The present invention is directed to a device for clearing fouling on a surface of a side-view mirror. The device comprises a curved tube that is affixable to a vehicle adjacent a side-view mirror extending outwardly therefrom.

The tube has an inlet end that is positionable facing generally forward in spaced-apart relation from the side-view mirror. An outlet end is positionable facing a mirror surface of the side-view mirror. An outer wall defines a lumen extending therethrough from an aperture in the inlet to an aperture in the outlet end.

The tube has a shape describing a partial "U", with a rearmost portion of the tube extending generally rearward. A plurality of small apertures, which are smaller than those through the inlet and outlet ends, extend through the wall generally at the tube's rearmost portion. The small apertures face generally rearward.

In use, when the vehicle is moving forward, air is forced into the device's inlet end aperture and passes through the tube's lumen to exit the outlet end aperture. Exiting air flows onto the mirror's surface, thereby preventing droplet buildup and fogging. The rearward-facing small apertures serve to channel moisture out of the tube's lumen, preventing additional droplets from impinging on the mirror's surface.

In another embodiment, an additional portion of the device has an outlet end aperture facing the side window adjacent the side-view mirror. In this embodiment, both the side-view mirror and the side window are cleared of fouling.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 5 is a top/side perspective view of a device including a window surface cleaning portion.
FIG. 6 is a side perspective view of the window surface cleaning portion of FIG. 5.

DETAILED DESCRIPTION OF THE PREFERRED EMBODIMENTS

Figure 1:
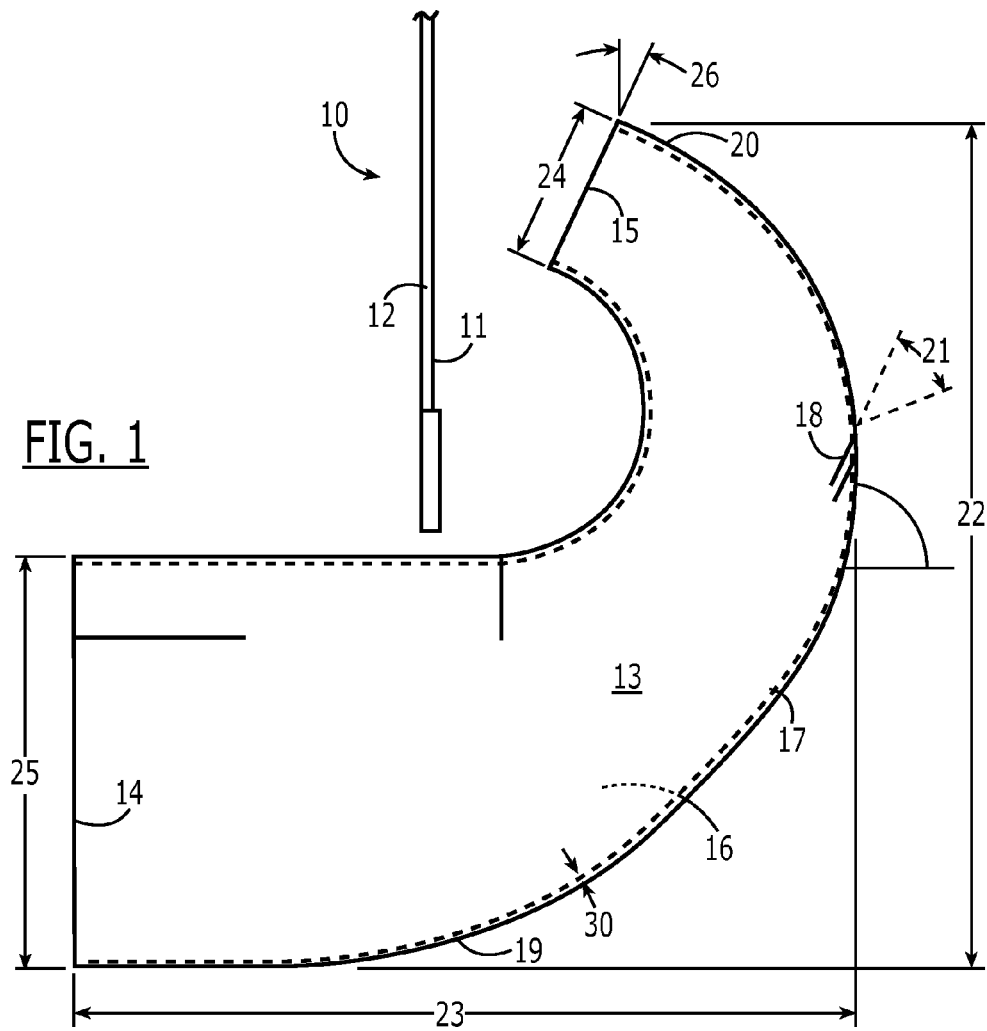
FIG. 1 is a side view of a side-view mirror surface clearing device of the present invention.

A description of the preferred embodiments of the present invention will now be presented with reference to FIGS. 1-7.

An exemplary embodiment of a device 10 for preventing and/or clearing fouling on a surface 11 of a side-view mirror 12 comprises a curved, generally "U"-shaped tube 13 that is affixable to a vehicle adjacent a side-view mirror that extends outwardly therefrom. The tube 13 in this embodiment curves upward from an inlet to an outlet end, and has a lumen 16 therethrough extending from an aperture 14 at the inlet end to an aperture 15 at the outlet end.

Both the inlet end 14 and the outlet end 15 apertures are positionable to face in a generally forward direction. The outlet end 15 is further positionable adjacent the side-view mirror's surface 11. This orientation is not intended as a limitation, as one of skill in the art will appreciate that the curvature could be in substantially any orientation so long as the tube's ends face generally forward and the outlet end faces generally toward the mirror's surface.

The tube 13 has an outer wall 17 defining the lumen 16. A plurality of small apertures 18 are positioned through the outer wall 17 that face in a generally rearward direction. In this embodiment, the small apertures 18 are arrayed approximately one-half the distance between outer ends of the tube 13, here, a bottom 19 and a top 20 of the tube 13, and have an approximate diameter of 0.062 in. Preferably the small apertures 18 extend downwardly through the outer wall 17 at an acute angle 21 less than normal to the outer wall 17, and, preferably, at an angle in a range of approximately 20-50 deg to normal, and, most preferably, approximately 35 deg to normal, although these values are not intended as a limitation.

Exemplary detailed dimensions of a device 10 for use with a vehicle will now follow. One of skill in the art will recognize, however, that these dimensions are not intended as limitations, and that a wide range of sizes could be used, depending, for example, upon the type of vehicle and size of mirror desired to be fitted with such a device.

This exemplary device 10 has a height 22 from top 20 to bottom 19 of 5.5 in., and a length 23 of 4.5 in. The outlet end aperture 15 has a height 24 of 1.0 in.; the inlet end aperture 14 has a height 25 of 3.0 in. The inlet end aperture 14 is substantially vertical, while the outlet end aperture 15 in this embodiment is not vertical, but at an angle 26 of 25 deg with the vertical.

In another embodiment, for example, for use with passenger automobiles, the device can have a height 22 from top 20 to bottom 19 of 4.0 in., and a length 23 of 4.0 in. The outlet end aperture 15 has a height 24 of 0.8 in.; the inlet end aperture 14 has a height 25 of 2.5 in. The inlet end aperture 14 is substantially vertical, while the outlet end aperture 15 in this embodiment is not vertical, but at an angle 26 of 25 deg with the vertical.

Figure 2:
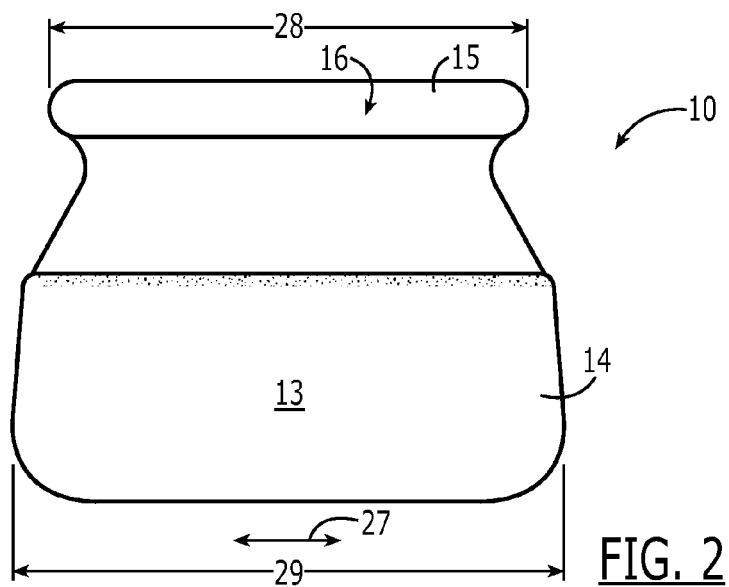
FIG. 2 is a rear view of the device of FIG. 1.
Figure 3:
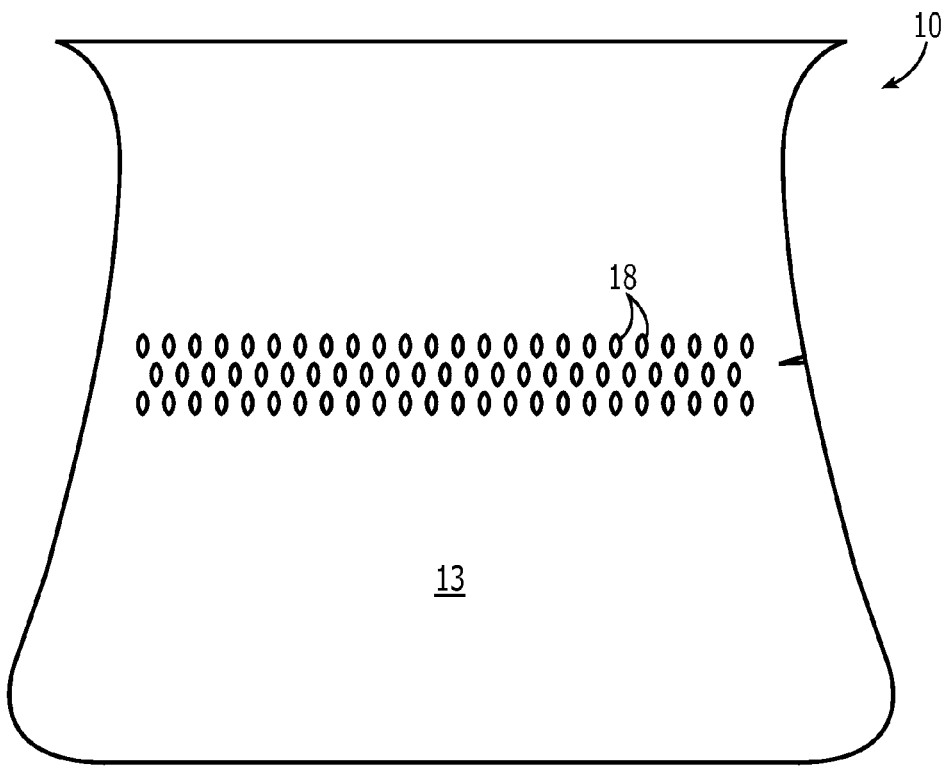
FIG. 3 is a front view of the device of FIG. 1.
Figure 4:
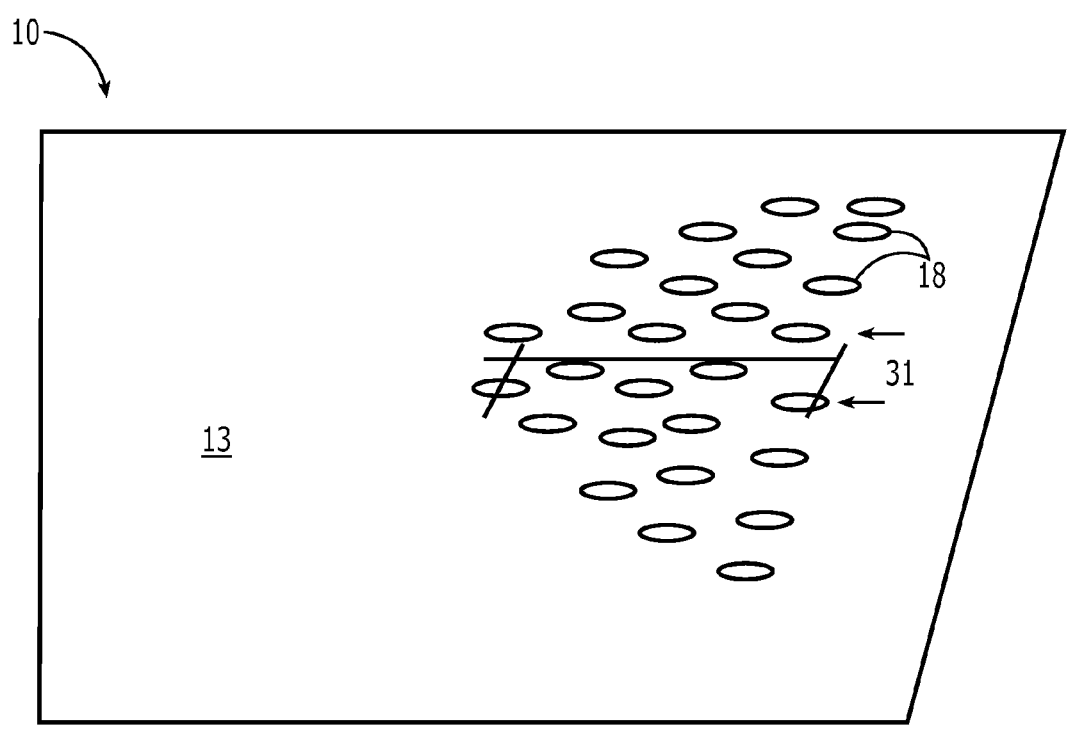
FIG. 4 is a top plan view of the device of FIG. 1.
Figure 7:
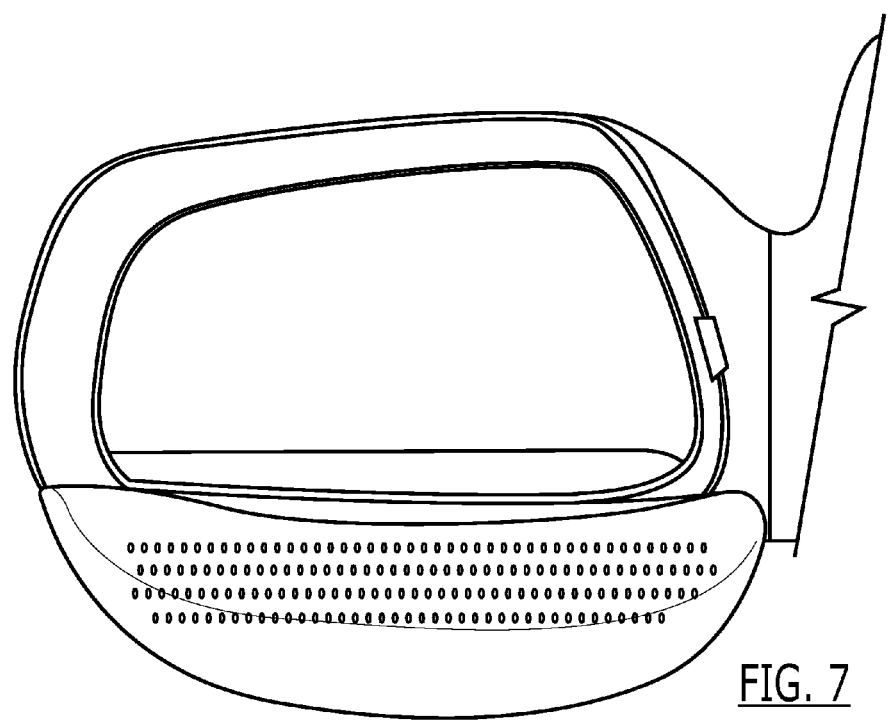
FIG. 7 is a front view of the embodiment of FIG. 1 illustrated in use with a side view mirror.

Preferably the tube 13 has a generally oval cross-section, with a long axis 27 generally horizontal (see FIG. 2). Both the inlet 14 and outlet 15 end apertures are radiused. The outlet end aperture 15 has a width 28 of 6 in.; the inlet end aperture 14 has a width 29 of 7 in. The tube wall 17 has a thickness 30 of approximately 0.2 in.

The small apertures 18 in the exemplary embodiment are arrayed (FIGS. 3 and 4) in a plurality of rows 31 0.5 in. apart, with the small apertures 18 staggered between adjacent rows 31.

In yet a further embodiment, a device 40 (FIGS. 5 and 6) is provided that includes an air-deflection portion for clearing a window adjacent a side mirror. The air-deflection portion comprises a curved window tube 41 affixed to the mirror tube 13.

The window tube 41 has an inlet end aperture 42 that is positionable facing generally forward in spaced-apart relation from the side-view mirror and an adjacent side window of the vehicle. A sideward-facing outlet end 43 is positionable adjacent the side window and behind the mirror tube 13. An outer wall 44 defines a lumen 45 extending therethrough from the inlet end aperture 42 to an aperture 50 at the outlet 43 end.

The window tube 41 has a shape generally describing a curved "L". A longer arm 46 of the "L" comprises an inlet sector, and a shorter arm 47 of the "L" comprises an outlet sector. The window tube's outlet end aperture 50 is substantially oval, having a width 48 greater than a height 49 thereof.

In an exemplary orientation, as illustrated in FIG. 5, the device 40 is affixable to the vehicle with both the mirror tube 13 and the window tube 41 curving upward from the respective inlet ends 14,42 to the respective outlet end apertures 15,42.

This exemplary embodiment 40 is constructed such that an inner side 50 of the mirror tube 13 is defined by an outer side 51 of the window tube 41. The device 40 can be constructed wherein the mirror portion 10 and the window portion 40 are separate units joined together, or are integral. The device 40 could also be formed with a common inlet end aperture, with a bifurcated outlet end, wherein the lumen leads to both the outlet apertures 15,50.

In use, the device 40, when affixed to a forward-moving vehicle, air is forced into the window tube's inlet end aperture 41 and is directed onto the side window, keeping the side window, as well as the side-view mirror, substantially free from debris and fogging.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the device illustrated and described herein are by way of example, and the scope of the invention is not limited to the exact details of construction or use.

What is claimed is:

1. A device for preventing and clearing fouling on a surface of a side-view mirror comprising:
    a curved tube affixable to a vehicle adjacent a side-view mirror extending outwardly therefrom, the tube having:
        an inlet end positionable facing generally forward in spaced-apart relation from the side-view mirror having an aperture therethrough;
        an outlet end positionable facing a mirror surface of the side-view mirror having an aperture therethrough;
        an outer wall defining a lumen extending therethrough from the inlet end to the outlet end apertures;
        a shape describing a partial "U", a rearmost portion of the tube extending generally rearward; and
        a plurality of small apertures having diameters less than a diameter of the outlet end aperture and extending through the wall generally adjacent the tube rearmost portion, the small apertures facing generally rearward;
    wherein, in use, the device affixed to a forward-moving vehicle, air is forced into the inlet end aperture and directed through the lumen onto the side-view mirror surface through the outlet end aperture, keeping the side-view mirror substantially free from debris and fogging, at least some water droplets contained in the air passing through the lumen exiting therefrom via the small apertures.

2. The device recited in claim 1, wherein the tube is positionable with the inlet end aperture beneath the side-view mirror, the tube thereby curving upward from the inlet to the outlet end.

3. The device recited in claim 1, wherein the small apertures are arrayed approximately one-half a distance defined by a top and a bottom of the tube.

4. The device recited in claim 3, wherein the small apertures extend downwardly through the outer wall at an angle less than normal to the outer wall.

5. The device recited in claim 4, wherein the small apertures extend through the outer wall at an angle in a range of 20-50 degrees to the normal.

6. The device recited in claim 1, wherein the small apertures are arrayed in a plurality of spaced-apart rows, the apertures staggered between adjacent rows.

7. The device recited in claim 1, wherein the inlet and the outlet end apertures are generally oval, each having a width greater than a height thereof.

8. The device recited in claim 1, wherein the curved tube comprises a mirror tube, and further comprising a curved window tube affixed to the mirror tube and having:
    an inlet end having an aperture therethrough and positionable facing generally forward in spaced-apart relation from the side-view mirror and an adjacent side window of the vehicle;
    a sideward-facing outlet end having an aperture therethrough and positionable adjacent the side window and behind the mirror tube;
    an outer wall defining a lumen extending therethrough from the inlet to the outlet end apertures; and
    a shape describing a curved "L", a longer arm of the "L" comprising an inlet sector and a shorter arm of the "L" comprising an outlet sector;
    wherein, in use, the device affixed to the forward-moving vehicle, air is forced into the window tube inlet end aperture and directed onto the side window, keeping the side window substantially free from debris and fogging.

9. The device recited in claim 8, wherein the window tube outlet end aperture is substantially oval, having a width greater than a height thereof.

10. The device recited in claim 8, wherein the device is affixable to the vehicle with both the mirror tube and the window tube curving upward from the respective inlet ends to the respective outlet ends.

11. The device recited in claim 10, wherein an inner side of the mirror tube is adjacent an outer side of the window tube.

12. The device recited in claim 8, wherein the mirror tube and the window tube are integral.

13. A device for preventing and clearing fouling on surfaces of a side-view mirror and a side window adjacent thereto comprising a curved tube affixable to a vehicle adjacent a side-view mirror extending outwardly therefrom, the tube having:
- an inlet end positionable facing generally forward in spaced-apart relation from the side-view mirror having an aperture therethrough;
- a bifurcated outlet end comprising a mirror surface outlet end positionable facing a mirror surface of the side-view mirror and a side window outlet end positionable facing an outer surface of the side window, the mirror surface outlet end and the side window outlet ends each having apertures therethrough;
- an outer wall defining a lumen extending therethrough from the inlet aperture to the mirror surface outlet end aperture and the side window outlet end aperture; and
- a plurality of small apertures having diameters less than diameters of the mirror surface and the side window outlet end apertures, the small apertures extending through the wall generally adjacent a rearmost portion of the tube;
- wherein, in use, the device affixed to a forward-moving vehicle, air is forced into the inlet end aperture and directed onto the side-view mirror surface through the mirror surface outlet end aperture and also directed onto the side window through the side window outlet end aperture, keeping the side-view mirror and the side window substantially free from debris and fogging, water droplets contained in the air passing through the lumen exiting therefrom via the small apertures.

14. The device recited in claim 13, wherein the tube is positionable with the inlet end beneath the side-view mirror, the tube thereby curving upward from the inlet to the outlet end.

15. The device recited in claim 13, wherein the small apertures are arrayed approximately one-half a distance defined by a top and a bottom of the tube.

16. The device recited in claim 13, wherein the small apertures extend downwardly through the outer wall at an acute angle to the outer wall.

17. The device recited in claim 13, wherein the small apertures extend through the outer wall at an angle in a range of 20-50 degrees to the normal.

18. The device recited in claim 17, wherein the small apertures extend through the outer wall at an angle of approximately 35 degrees to the normal.

19. The device recited in claim 13, wherein the apertures are arrayed in a plurality of spaced-apart rows, the apertures staggered between adjacent rows.

20. The device recited in claim 13, wherein the inlet end and the outlet end are generally oval, each having a width greater than a height thereof.

* * * * *